(12) United States Patent
Humayun et al.

(10) Patent No.: US 6,805,801 B1
(45) Date of Patent: Oct. 19, 2004

(54) METHOD AND APPARATUS TO REMOVE ADDITIVES AND CONTAMINANTS FROM A SUPERCRITICAL PROCESSING SOLUTION

(75) Inventors: Raashina Humayun, San Jose, CA (US); Patrick Christopher Joyce, San Jose, CA (US)

(73) Assignee: Novellus Systems, Inc., San Jose, CA (US)

( * ) Notice: Subject to any disclaimer, the term of this patent is extended or adjusted under 35 U.S.C. 154(b) by 239 days.

(21) Appl. No.: 10/099,555

(22) Filed: Mar. 13, 2002

(51) Int. Cl.[7] .............................................. B01D 15/00
(52) U.S. Cl. ..................... 210/663; 210/665; 210/669; 210/690; 210/175; 210/263; 210/295; 210/321.6; 210/500.21; 210/194
(58) Field of Search ................................ 210/638, 643, 210/634, 660, 663, 665, 669, 690, 767, 263, 295, 321.6, 500.21, 175, 194

(56) References Cited

U.S. PATENT DOCUMENTS

| 5,470,377 A | 11/1995 | Whitlock |
| 5,676,737 A | 10/1997 | Whitlock |
| 6,361,696 B1 * | 3/2002 | Spiegelman et al. ........ 210/662 |

* cited by examiner

Primary Examiner—Robert A. Hopkins
(74) Attorney, Agent, or Firm—Beyer Weaver & Thomas LLP

(57) ABSTRACT

The present invention pertains to methods and apparatus for removal of one or more solutes from a supercritical process solution. Solute additives and contaminants are removed from supercritical processing solutions via a contaminant removal system that is either part of the process vessel itself or is part of a local recirculation loop in fluid communication with the process vessel. This invention provides supercritical processing methods and apparatus for the removal of additives and contaminants during circulation so that depressurization and substrate removal can occur without contamination. The removal in some cases, for example cleaning residue, can be done continuously during a process to improve its efficiency. Removal mechanisms may include separation, destruction, conversion of the contaminant to acceptable species, or combinations thereof.

32 Claims, 5 Drawing Sheets

METHOD AND APPARATUS TO REMOVE ADDITIVES AND CONTAMINANTS FROM A SUPERCRITICAL PROCESSING SOLUTION

CROSS-REFERENCE TO RELATED APPLICATION

This application is related to U.S. patent application Ser. No. 10/067,520, which is hereby incorporated by reference for all purposes.

FIELD OF THE INVENTION

The present invention pertains to methods and apparatus for removal of solutes and/or contaminants including particles from a supercritical processing solution. More particularly, the invention pertains to methods and apparatus for removing additives and contaminants from supercritical processing solutions via a contaminant removal system that incorporates local recirculation of supercritical solutions during purification.

BACKGROUND OF THE INVENTION

Supercritical fluids are effective mediums for reagent transport, reaction, and removal of impurities. Supercritical fluids are particularly useful for integrated circuit fabrication, including deposition of thin films and cleaning wafers and circuit devices. The increased importance of quality control, coupled with high throughput requirements in the semiconductor industry in particular, require innovative methods of utilizing this technology. What is lacking in the art are more reliable and practical apparatus and methods of using supercritical fluids.

Conventional methods and apparatus that use supercritical fluids for processing wafers involve batch type non-continuous processing. For example, in a supercritical cleaning apparatus, a wafer is placed into an empty process vessel that is then filled and pressurized with a supercritical solution, typically containing some reactant, precursor, or cleaning agent. When the process is complete, the reactor needs to be flushed to remove excess reactant, precursor, cleaning agent, and any contaminants including dissolved and particulate residue before the vessel can be depressurized and the wafer can be removed. The unreacted additives and/or contaminants may be recovered or otherwise handled downstream using a mechanism separate from the supercritical reactor. However, such methods require large amounts of solvent because the supercritical solution containing the precursor, reactant, cleaning agent, or contaminant must either be completely displaced from the reactor or diluted to a level sufficient to avoid precipitation or deposition of the used or unwanted chemicals on the wafer. Additionally, dilution times can be large and throughput suffers.

What is needed therefore are methods and apparatus that recycle supercritical solvents while removing unused reagents from a supercritical reactor more quickly and with minimal solvent wastage.

SUMMARY OF THE INVENTION

The present invention pertains to methods and apparatus for removal of one or more solutes from a supercritical process solution. Solute additives and contaminants are removed from supercritical processing solutions via a contaminant removal system that is either part of the process vessel itself or is part of a local recirculation loop in fluid communication with the process vessel. This invention provides supercritical processing methods and apparatus for the removal of additives and contaminants during circulation so that depressurization and substrate removal can occur without contamination. The removal in some cases, for example cleaning residue, can be done continuously during a process to improve its efficiency. Removal mechanisms may include separation, destruction, conversion of the contaminant to acceptable species, or combinations thereof.

After processing a substrate with the supercritical solution, the solutes are separated from the supercritical solution during recirculation to produce a purified solvent The purified solvent can be recirculated to the process vessel for further use in supercritical processing. The solutes are removed from the solution intact, converted to acceptable by-products, or in some cases are destructively removed from the supercritical solution. The intact solutes (either pure or not) can be recovered for disposal or purified for reuse. Solvent volumes and process times for supercritical processing are reduced because dilutions and flushes of the apparatus are obviated.

Thus, one aspect of the invention is an apparatus for removing one or more solutes from a supercritical solution. Such apparatus may be characterized by the following features: a process vessel configured to treat a workpiece (e.g. a semiconductor wafer) with the supercritical solution; a recirculation loop coupled to the process vessel and allowing fluid communication with the process vessel, and a contaminant removal mechanism for removing the one or more solutes from the supercritical solution to provide a purified solvent. Preferably at least one of the process vessel and the recirculation loop include components of the contaminant removal mechanism. Preferably the purified solvent is a supercritical solvent.

The contaminant removal mechanism of the invention may treat the supercritical solution in one or more ways in order to separate the one or more solutes from the supercritical solution. Preferably, the contaminant removal system includes at least one of an irradiation mechanism, a heating mechanism, a cooling mechanism, a pressurization mechanism, a depressurization mechanism, a chemical addition mechanism, a filtration mechanism, a phase transfer mechanism, and a fluid pumping mechanism.

In a preferred embodiment, the contaminant removal mechanism removes a coarse fraction of the one or more solutes and then a fine fraction of the one or more solutes. The contaminant removal mechanism can include a plurality of individual removal mechanisms. In one example a contaminant removal mechanism of the invention includes a primary removal mechanism and a secondary removal mechanism. The primary mechanism is for removing the bulk (a majority) of the one or more solutes, and the secondary removal mechanism is for further purifying the process fluid by removing smaller amounts of the one or more solutes that remain in the fluid after the first removal mechanism. The first and second removal mechanisms preferably, but not necessarily, contain different separation mechanisms for removal of the one or more solutes. For example, in a particularly preferred embodiment, the first removal mechanism includes a heating mechanism and/or a cooling mechanism, while the second removal mechanism includes an adsorption mechanism. Preferably heating mechanisms of the invention include at least one of internal electrical or heating fluid circulation coils, external electrical or heating fluid circulation coils, a tube in tube heat exchanger, a shell and tube heat exchanger, and a radiative heating mechanism. Preferably cooling mechanisms of the invention include at least one of an internal or external circulated cooling fluid coils, refridgeration coils, and an evaporative cooling mechanism.

As mentioned the purified solvent is preferably, but not necessarily, a supercritical solvent. In the case that the purified solvent is not supercritical, the contaminant removal system may include mechanisms to convert the purified solvent to a supercritical purified solvent.

Another aspect of the invention is a method of removing one or more solutes from a supercritical processing solution. Such methods may be characterized by the following sequence: flowing the supercritical processing solution through a process vessel and a recirculation loop, at least one of the process vessel and the recirculation loop including components of a contaminant removal mechanism; removing at least a portion of the one or more solutes with the contaminant removal mechanism to produce a purified solvent, the purified solvent having a reduced concentration of the one or more solutes; and recirculating the purified solvent through the process vessel and the recirculation loop. Preferably removing at least a portion of the one more contaminants with the contaminant removal mechanism includes exposing the supercritical processing solution to a set of conditions which separate the portion of said one or more solutes from the supercritical processing solution to produce the purified solvent and a contaminant phase. Also preferably, the purified solvent is a supercritical solvent.

Preferably the set of conditions that the supercritical solution is exposed to in the contaminant removal mechanism includes at least one of heating, cooling, irradiation, pressurization, depressurization, chemical addition, adsorption, filtration, oxidation, reduction, precipitation, and combinations thereof. Preferably at least a portion of the contaminant phase is removed from the contaminant removal mechanism during operation.

These and other features and advantages of the present invention will be described in more detail below with reference to the associated drawings.

DETAILED DESCRIPTION OF THE PREFERRED EMBODIMENTS

Figure 1:
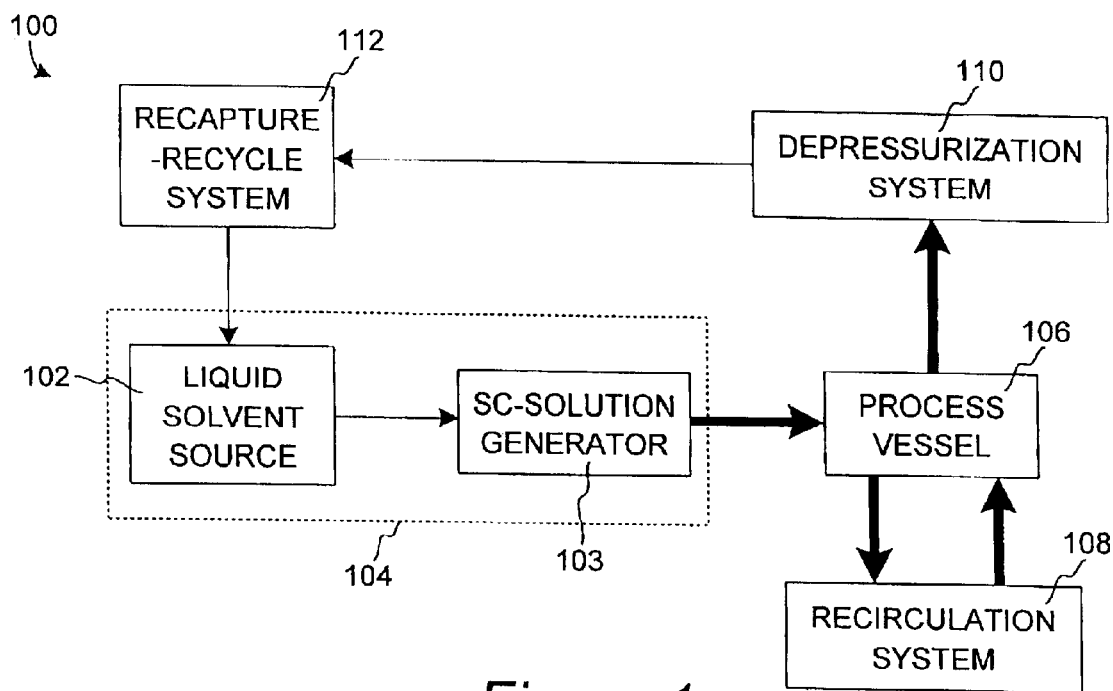
FIG. 1 is a simplified block diagram of a wafer cleaning apparatus.

In the following detailed description of the present invention, numerous specific embodiments are set forth in order to provide a thorough understanding of the invention. However, as will be apparent to those skilled in the art, the present invention may be practiced without these 'specific details or by using alternate elements or processes. For example, the following description identifies a semiconductor wafer as a work piece to be processed with supercritical media The invention is not so limited. The work piece may be of various shapes, sizes, and materials. In addition to semiconductor wafers, other work pieces that may take advantage of this invention include various articles such as printed circuit boards, flat panel displays, and the like. In some instances well-known processes, procedures, and components have not been described in detail so as not to unnecessarily obscure aspects of the present invention.

DEFINITIONS

In order to describe certain embodiments of the invention, some terms used herein are defined as follows. These definitions are provided to assist the reader in understanding the concepts exemplified in the specification and the definitions do not necessarily limit the scope of this invention.

Supercritical fluid, solution, or solvent—Supercritical fluids or solutions exist when the temperature and pressure of a solution are above its critical temperature and pressure. In this state, there is no differentiation between the liquid and gas phases and the fluid is referred to as a dense gas in which the saturated vapor and saturated liquid states are identical. Near supercritical fluids or solutions exist when the temperature and pressure of a solution are both greater than 80% of their critical point, but the solution is not yet in the supercritical phase. Due to their high density, supercritical and near supercritical fluids possess superior solvating properties than gases while possessing better transport properties than liquids. Various additives or cosolvents may be added to a pure supercritical fluid to further tune or customize its solvent and/or reactive properties. In this application, when a fluid, solvent, or solution is referred to as "supercritical" it is understood to describe both supercritical and near supercritical conditions. In this application, the term "supercritical solution" generally refers to the supercritical form of a solvent and one or more solutes. The solute may be a reagent, a reactant, another solvent, or other material.

Wafer—The term "wafer" may be used interchangeably with "wafer substrate," "substrate," "semiconductor wafer," "partially fabricated integrated circuit," and the like. One skilled in the art would understand that these terms can refer to a silicon (semiconductor) wafer during any of many stages of integrated circuit fabrication thereon.

Process vessel—A process vessel in this context is a vessel in which a substrate (e.g. a wafer) is exposed to a particular media for the purpose of treating the substrate in some way. In the wafer example, a process vessel may be used for cleaning, depositing a layer, or otherwise preparing a surface or surfaces of the wafer.

Solute—A solute is a compound that is dissolved in a supercritical solvent. This may include a chemical additive (e.g. cleaning agent, deposition precursor, etc.) that is used to prepare a supercritical solution, a reaction product or by-product, or a residue that is removed from a substrate during cleaning via dissolution into a supercritical solvent. In this application, solutes in, supercritical solutions are generally referred to as "contaminants" because they are the species that the invention is designed to remove from a supercritical solution to make a purified solvent.

Particle—A solid, semi-solid, or like species that is not dissolved in the supercritical solvent but rather are entrained or suspended in it.

Reactant—This term encompasses compounds used in any particular reaction that are transformed or converted by the reaction and are not "spectators" in the reaction. More specifically, a reactant may be added to a supercritical solution in order to effect a chemical reaction between the reactant molecules and the solute in the supercritical solution. The desired result of such a reaction is generally the separation of the solute from the supercritical solutions. For example, a reactant is added which combines with the solute to form a product that is insoluble in the supercritical solution and thus precipitates out of solution and purifies the solution due to a phase separation.

Reagent—Reagents are those compounds used in a reaction that are not altered themselves. Such molecules include solvents, catalysts, complexing agents, and other reaction mediators. Reagents are, overall, spectators in the reaction. Although they may be intimately involved with the reactants during the reaction, generally neither they nor subsets of their molecular structure are altered as a result of the reaction. For example, a complexing reagent is added to a supercritical solution. The complexing agent binds to the solute, through for example non-chemical bond forming attraction, in the supercritical solution and, for example, forms a complex which is insoluble in the supercritical solution. The complexing reagent-solute complex precipitates (a separation) from the supercritical solution. The separated complex may be removed and the complexation reversed to produce the complexing agent and the solute either or both of which may be reused in another supercritical process.

Solvent—A solvent is generally the fluid medium in which a reaction takes place or a solute is dissolved. There are cases in which a solvent serves multiple roles, for example both as a reactant and a reagent.

Adsorbent—An adsorbent material is a solid or semi-solid material that interacts with a solute via internalization to remove it from a solution. The interaction is based on some energetic criteria, for example an electrostatic attraction between solute molecules and an adsorbent material.

Filtration—Filtration is the separation of for example a solid (particle) from a solution by means of size exclusion. This is differentiated from adsorption, in that there is no inherent energetic criteria to the selectivity of a filtration mechanism towards a material.

Phase Transfer mechanism—A phase transfer mechanism refers to an apparatus for physically separating two or more distinct phases of matter by means of taking advantage of the affinity for a solute for one solvent over another. A phase transfer mechanism can be a vessel, for example, in which a supercritical solvent with a solute therein, is exposed to another solvent (immiscible in the supercritical solvent, i.e. a biphasic mixture) for which the solute has a much greater affinity. By virtue of its affinity, the solute travels into the other solvent, that is, transfers from one phase to another phase. In another example, a supercritical solution is passed over a solid that has a higher affinity for one or more solutes in the supercritical solution. The solid absorbs the one or more solutes and thus produces a purified supercritical solvent, for example.

METHODS AND APPARATUS OF THE INVENTION

As mentioned, the invention finds particular use in removing solutes from supercritical solutions. One advantage of using supercritical solvents for processing is the tunable solvating power of such solvents. The solvating power of these fluids is often enhanced by the addition of solutes that act as cosolvents. Other additives like specific reactants, catalysts, complexing agents, surfactants, passivating agents may also be added to the fluid. Depending on the nature of the additive and the specific application, often times large amounts of solutes are added to the pure supercritical solvent (e.g. $CO_2$). In addition, other species (e.g. dissolved photoresist, particles and other contaminants may be incorporated into the fluid during processing. The invention allows removal of such solutes from supercritical processing solutions via a contaminant removal system that is either part of the process vessel, part of a local recirculation loop in fluid communication with the process vessel, or part of both. After processing a substrate with the supercritical solution, the solutes are separated from the supercritical solution to produce a purified solvent. The purified solvent is circulated through the process vessel and loop for further use in supercritical processing. The solutes are recovered or in some cases are destructively removed from the supercritical solution. Solvent volumes for supercritical processing are reduced because dilutions and flushes are obviated.

FIG. 1 shows a wafer cleaning system, 100. Wafer cleaning system 100 is an exemplary wafer processing system that uses supercritical solutions (containing solutes as described above) to clean wafers. Preferably, the invention is used in conjunction with such a wafer processing system. Wafer cleaning system 100 is described in more detail in U.S. patent application Ser. No. 10/067,520 which is incorporated by reference herein for all purposes.

Included in wafer cleaning system 100 are a solvent delivery mechanism 104, a process vessel 106, a recirculation system 108, a depressurization system 110, and a recapture-recycle system 112. Solvent delivery mechanism 104 includes a liquid solvent source 102 and supercritical solution generator 103. Solvent delivery mechanism 104 receives a sub-critical liquid solvent (for example liquid carbon dioxide) and converts it to a supercritical solution. The resulting solution is delivered to process vessel 106 (the heavy arrows in FIG. 1 depict supercritical fluid communication between solvent delivery mechanism 104, process vessel 106, recirculation system 108, and depressurization system 110; the fine arrows depict sub-critical fluid communication within apparatus 100). The supercritical solution contacts a wafer or wafers held within process vessel 106. The supercritical solution is recirculated through process vessel 106 (and over the wafer or wafers) via recirculation system 108. After processing the wafers, the supercritical solution is vented via depressurization system 110. Subcritical solvent exits system 110 and is recaptured and processed (preferably recycled) in recapture-recycle system 112. Purified solvents from system 112 are reintroduced into solvent delivery mechanism 104 in a sub-critical state (preferably to liquid solvent source 102).

Preferably a contaminant removal mechanism of the invention is part of a recirculation system that circulates supercritical solution through a process vessel as described for recirculation system 108. However the process vessel can include all or components of the contaminate removal mechanism. For example, a radiation source integral to a process vessel is used at the end of a process to breakdown solutes or contaminants to purify a supercritical solution therein. In another example, a catalytic surface (activated by light, heat, or other stimulus) within the process vessel is activated after a supercritical process is complete, during the process, or otherwise when contaminant removal is desired.

Figure 2:
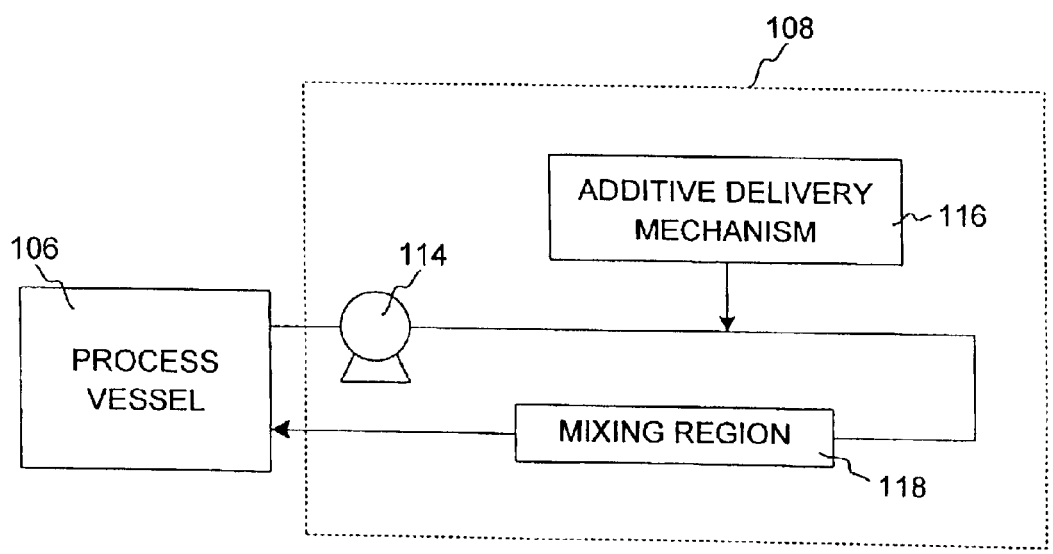
FIG. 2 is a simplified block diagram of a component of the wafer cleaning apparatus from FIG. 1.

FIG. 2 is a simplistic representation of recirculation system, 108 (within dotted line area), in fluid communication with process vessel 106. Preferably, recirculation system 108 recirculates a supercritical solution through process vessel 106 such that a flow field is established over at least one surface of a wafer or wafers contained in process vessel 106. Preferably, recirculation system 108 includes valves for isolating the recirculating system from the process vessel.

After process vessel 106 has attained a desired pressure, the supercritical cleaning solution contained within is recirculated over the wafer substrate. This recirculation improves mixing of the residue to be cleaned from the wafer with the supercritical cleaning solution. It also enhances the rate at which fresh cleaning solution may be presented to the wafer surface. Another benefit of recirculation of supercritical cleaning solution through process vessel 106, is to permit controlled addition of chemical additives that might be necessary to perform selected residue removal. By adding chemical additives into a flow stream of supercritical cleaning solution, mixing and dissolution of the additives is enhanced.

In its recirculation path, supercritical cleaning solution exits process vessel 106 and enters a recirculation loop. While in the loop, the solution traverses a pump 114, and a mixing region 118. Chemical additives are introduced into the recirculation loop via an additive delivery mechanism 116. In this case, a chemical additive (solute) is introduced into the recirculation loop where it is combined with the supercritical cleaning solution. The mixture of additive and supercritical cleaning solution traverses a portion of the recirculation system (for example) and enters mixing region 118. Mixing region 118 is added "in-line" in the recirculation loop to ensure proper mixing and dissolution of additives in the supercritical cleaning solution.

Figure 3:
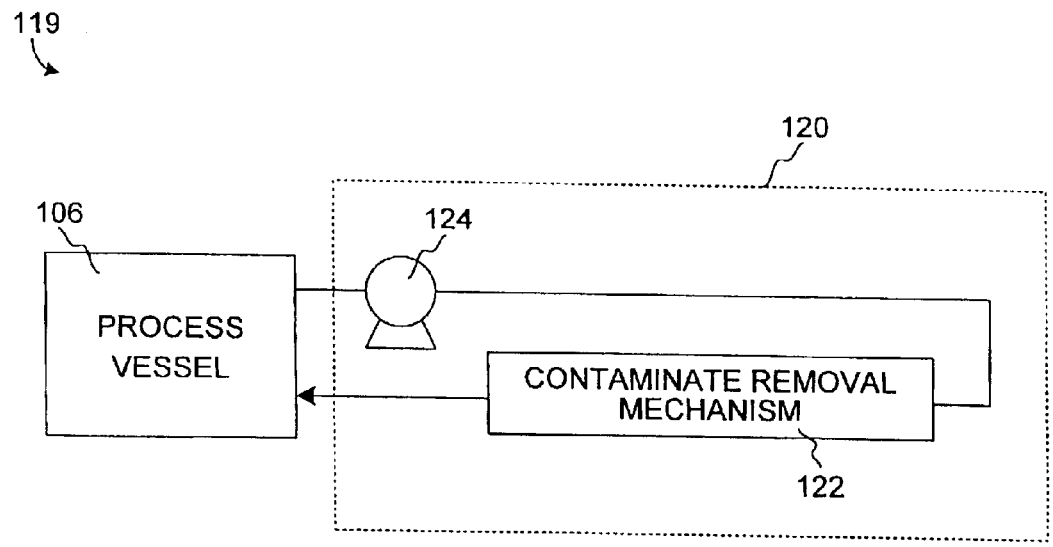
FIG. 3 is a simplified block diagram of an apparatus in accordance with the invention.

FIG. 3 is a simplistic block diagram of an apparatus, 119, of the invention for removing one or more solutes from a supercritical solution. Apparatus 119 includes a process vessel, 106, configured to treat semiconductor wafers with a supercritical solution, and a recirculation loop, 120, coupled to the process vessel. Recirculation loop 120 allows fluid communication with the process vessel. Recirculation loop 120 includes a pump, 124, and a contaminant removal mechanism, 122, for removing one or more solutes from the supercritical solution to provide a purified solvent. That is, a supercritical solution (containing one or more solutes) enters recirculation loop 120, at least a portion of the one or more solutes are removed from the supercritical solution by contaminant removal mechanism 122, and then a purified solvent exits the contaminant removal system and reenters process vessel 106. Preferably the purified solvent is a supercritical solvent. More specifically, preferably the contaminant removal mechanism separates the one or more solutes from the supercritical solution while maintaining supercritical conditions.

Contaminant removal system 119, can be a full-time open system as depicted in FIG. 3. That is, supercritical fluid can recirculate freely from process vessel 106, and through the recirculation loop (including pump 124 and contaminant removal mechanism 122). In this case, supercritical fluid flows freely through the recirculation loop and the process vessel during processing. During processing, contaminant removal mechanism 122 is inactive, that is, it serves as a flow conduit for the circulating supercritical fluid. After processing, contaminant removal mechanism 122 is actuated for removing solutes. Contaminant removal mechanism 122 then acts upon the circulating supercritical solution to remove one or more solutes from the supercritical solution to produce a purified solvent. In another example, the recirculation loop is isolated from the process vessel by appropriate valves.

Figure 4:
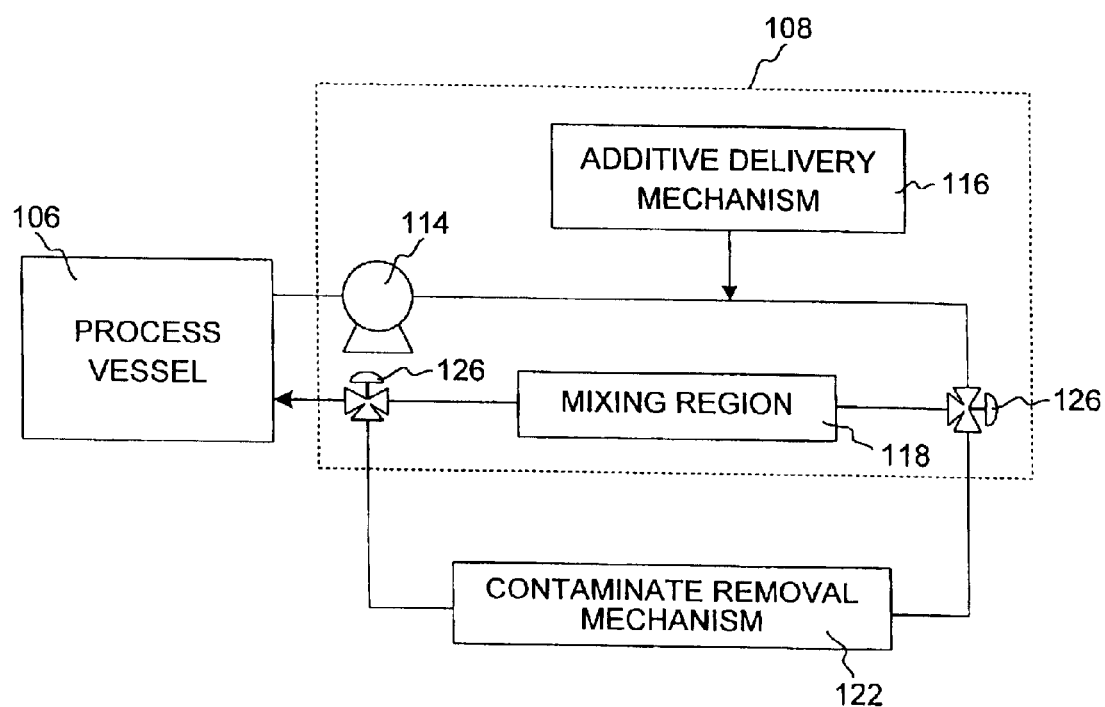
FIG. 4 is a simplified block diagram showing how apparatus of the invention may be incorporated into a wafer processing apparatus.

Apparatus of the invention can be embodied in a recirculation loop that performs other functions than described for the invention. For example, the invention may be part of the recirculation system as described in relation to FIG. 2. This scenario is depicted in FIG. 4. In this example, recirculation system 108 is shown, as before, in fluid communication with process vessel 106. Valves 126 allow switching from recirculation system 108 to contaminant removal mechanisms of the invention for removing one or more solutes from the supercritical solution. Specifically, valves 126 are three way valves. Valves 126 can be configured to allow circulation of supercritical solution through recirculation system 108, contaminant removal mechanism 122 (or both 108 and 122).

In a particularly preferred embodiment, a supercritical solution is passed simultaneously through recirculation system 108 and contaminant removal mechanism 122 during, for example, wafer processing. This is one way to maintain supercritical conditions within contaminant removal system 122 during processing of a substrate in process vessel 106. During processing, for example, contaminant removal mechanism 122 is inactive. After processing is complete, valves 126 are adjusted to stop the flow of supercritical solution through mixing region 118. Then contaminant removal mechanism 122 is actuated for removing solutes and producing purified solvent for recirculation to the process vessel.

Figure 5:
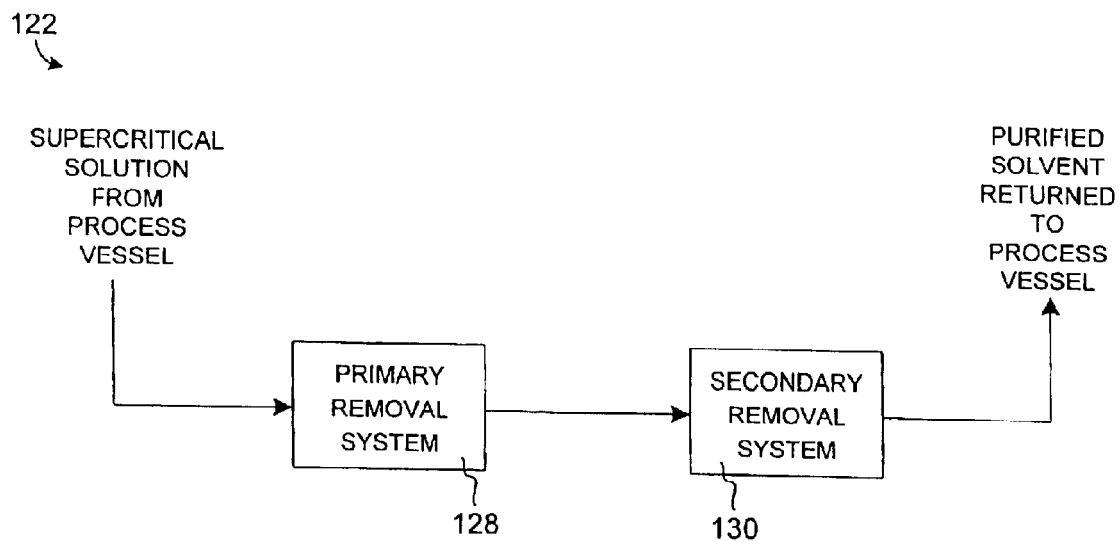
FIGS. 5–8 are simplified block diagrams showing contaminant removal mechanisms in accordance with the invention.

Contaminant removal mechanisms of the invention typically, but not necessarily, have more than one solute removal mechanism. For example, as illustrated in FIG. 5, contaminant removal mechanism 122 may include a primary removal mechanism, 128, and a secondary removal mechanism, 130. In this example, supercritical solution from a process vessel first passes through primary removal system 128 where, for example, a bulk of solute is removed. Then the supercritical solution passes through secondary removal mechanism 130 where, for example, a smaller amount solute is removed to create a purified solvent. The purified solvent is then returned to the process vessel.

Preferably, but not necessarily, the primary removal mechanism and the secondary removal mechanism include different means for separating solutes from the supercritical solution. Preferably, the contaminant removal system of the invention includes at least one of an irradiation mechanism, a heating mechanism, a cooling mechanism, pressurization mechanism, a depressurization mechanism, a chemical addition mechanism, and a filtration mechanism. Therefore, the primary removal mechanism and the secondary removal mechanism will each include at least one of the above mentioned mechanisms.

Figure 6:
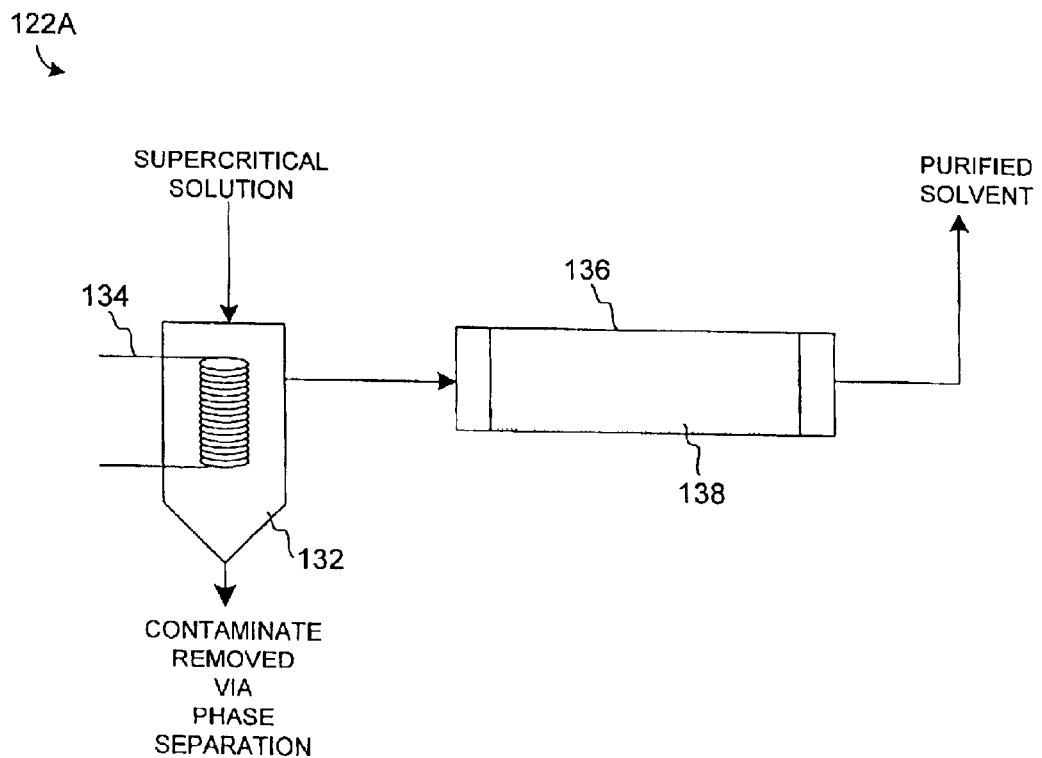

An example of this is shown in FIG. 6, which depicts a contaminant removal mechanism, 122A, of the invention. Contaminant removal mechanism 122A includes a primary removal mechanism 132 and secondary removal mechanism 136. Primary removal mechanism 132 includes a chamber through which the supercritical solution passes during removal of one or more solutes. In this example, primary removal mechanism 132 includes coils 134. Coils 134 are used, for example, as heating coils, cooling coils, or both. Supercritical solution enters primary removal mechanism 132 and is for example, heated or cooled. Preferably the heating or cooling does not bring the supercritical solution from a supercritical state. However, preferably the heating and/or cooling causes one or more solutes in the supercritical solution to phase separate from the supercritical solution. For example, the supercritical solution is cooled to a temperature within its supercritical regime that is sufficient to precipitate a solute. The precipitated solute (contaminant) is removed, and the solvent travels to secondary removal mechanism 136. In an another example, supercritical solution enters primary removal mechanism 132 where it is heated. Heating causes a shift in the density of the supercritical solution thus precipitating a solute. The precipitated solute (contaminant) is removed, and the solvent travels to secondary removal mechanism 136.

Preferably removal mechanisms of the invention separate solutes from supercritical solutions as they circulate through a recirculation loop. Preferably, phase separation of a solute allows for simple designs. For example, as a supercritical solution flows through primary removal mechanism 132, a solute precipitates (or otherwise phase separates) and falls to the bottom of a tall chamber. By situating a flow outlet in a high position on the chamber, interaction of precipitates (or denser liquids for example) and the flow outlet can be avoided. The flow parameters (e.g. velocity) through the contaminant removal system may or may not be the same as, for example, the flow parameters used for recirculation during substrate processing.

Preferably, primary removal mechanism 132 removes a bulk portion (majority) of one or more solutes from the supercritical solution. Once the bulk of the one or more solutes are removed, the supercritical solution then passes to secondary removal mechanism 136. Secondary removal mechanism 136, in this example, is a column which houses an adsorbent material 138. Adsorbent material 138 preferably includes at least one of activated carbon, zeolite, molecular sieve, ion exchange resin, polymeric resin, and the like. Adsorbent material 138 may remove the one or more solutes from the supercritical solution resulting in greater levels of purity than afforded by the primary removal mechanism 132. For example, the adsorbent material has a high affinity for the one or more solutes, but has a limited capacity for the solutes. This condition is acceptable because in this example the bulk of the one or more solutes are removed from the supercritical solution by the primary removal mechanism 132. After passing through secondary removal mechanism 136, a purified solvent results.

Figure 7:
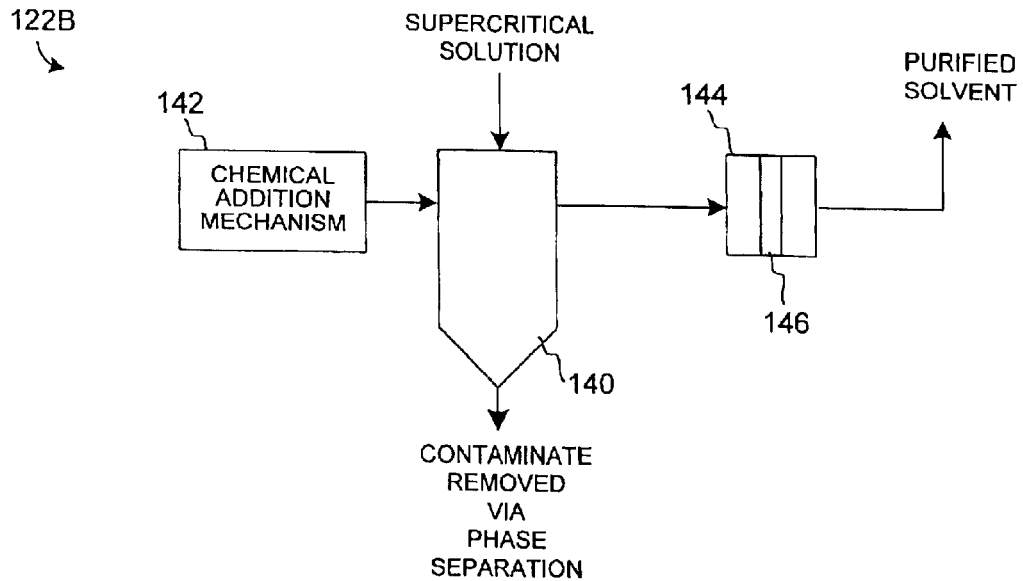

Another example of a contaminant removal mechanism of the invention is depicted in FIG. 7. Contaminant removal mechanism, 122B (like 122A), has a primary removal mechanism and a secondary removal mechanism. In this case, the primary removal mechanism includes a chamber 140 and a chemical addition mechanism 142. Supercritical solution entering chamber 140 interacts with a chemical additive introduced into chamber 140 via chemical addition mechanism 142. As described above, addition of an appropriate chemical additive preferably initiates a phase separation between the one or more solutes from the supercritical solution. Preferably chemical addition includes introduction of at least one of a reagent and a reactant to the supercritical processing solution. Preferably the reagent includes at least one of a complexing agent, a solvent, an antisolvent, a catalyst, an adsorbent, and a surfactant. Preferably the reactant or the catalyst include at least one of an oxidant, a reductant, an acid, a base, a nucleophile, an electrophile, a free radical source, a radical initiator, and a metal oxide. In one example, a complexing agent is added to a supercritical solution. The complexing agent binds reversibly (or irreversibly) to a solute or solutes in the supercritical solution. This binding causes the formation of an insoluble complex between the complexing agent and the solute. The complex precipitates from the supercritical solution to afford a supercritical solution having preferably less than a majority of the original solute concentration. In another example, chemical addition mechanism 142 is used to inject an antisolvent into the supercritical solution. The addition of the antisolvent changes the character of the supercritical fluid so that the one or more solutes in the supercritical solution now become primarily insoluble in it. This causes the one or more solutes to precipitate from the supercritical solution.

Once the supercritical solution exits primary removal mechanism 140 it contains much less solute than when it entered 140. This supercritical solution then enters secondary removal mechanism 144, as shown in FIG. 7. In this example, secondary removal mechanism 144 contains a filtration mechanism 146. Rather than adsorbing a solute, as described above, filter element 146 (for example) is a semi-permeable membrane which is selective for impeding the solute molecules in the supercritical solution from passing through the membrane. Thus supercritical solution passing through the membrane loses solute on the upstream side of filter membrane 146. As before, the contaminant removal mechanism depicted in FIG. 7 contains a coarse removal mechanism and a fine removal mechanism. Primary removal mechanism 140 removes a bulk of the solute (coarse removal), while secondary removal mechanism 144 further purifies the process fluid by fine removal of the solute. The purified solvent thus exits secondary removal mechanism 144 for return to the process vessel.

Figure 8:
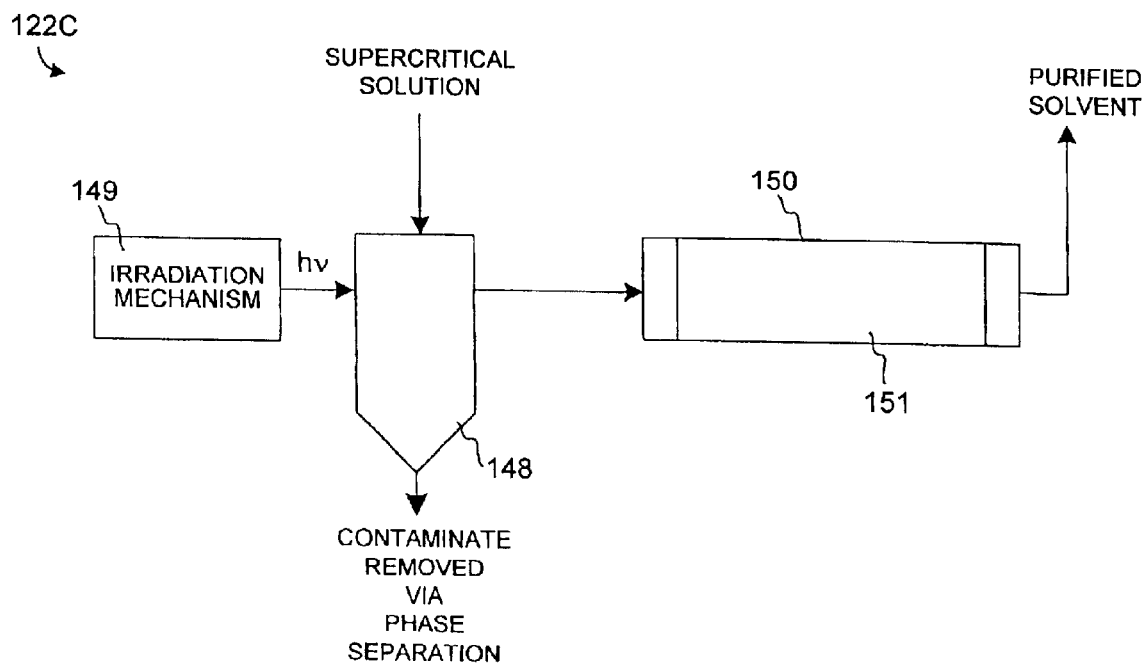

Yet another example of a contaminant removal mechanism of the invention is depicted in FIG. 8. Contaminant removal mechanism, 122C, has a primary removal mechanism and a secondary removal mechanism. In this case, the primary removal mechanism includes a chamber 148 and an irradiation mechanism 149. Supercritical solution entering chamber 148 interacts with a particular type of radiation introduced into chamber 148 via irradiation mechanism 149. As described above, addition of an appropriate form of radiation preferably initiates a phase separation between the one or more solutes and the supercritical solution. Preferably the irradiation mechanism includes at least one of an ultraviolet source, a high intensity discharge source, and a visible to near IR source. In one example, exposure of a solute to irradiation causes it to form an insoluble form of the solute molecules. For example, a polymerizable solute is exposed to ultraviolet light which causes the solute to polymerize into a polymer that is insoluble in the supercritical solution. The polymer precipitates from the supercritical solution to afford a supercritical solution having preferably a majority of the solvent removed. In another example, a form of radiation that destroys or otherwise changes the solute molecules is applied to the supercritical solution. The solvent molecules are either converted to insoluble molecules that will phase separate, or converted into very high vapor pressure components (e.g. $CO_2$, $CH_4$ etc.) that are miscible with the supercritical fluid and for example remain in solution (i.e not precipitate) upon $CO_2$ depressurization. In the latter example, purification is achieved because the contaminants are removed by conversion to acceptable byproducts in situ.

Once the supercritical solution exits primary removal mechanism 148 it contains much less solute than when it entered 148. This supercritical solution then enters secondary removal mechanism 150, as shown in FIG. 8. Secondary removal mechanism 150, in this example, is a column which houses an adsorbent material 151. Adsorbent material 151 preferably has a high affinity for the solute molecules, as described above. Adsorbent material 151 may remove the one or more solutes from the supercritical solution in lesser amounts than primary removal mechanism 148. After passing through secondary removal mechanism 150, a purified solvent results. The purified solvent thus exits secondary removal mechanism 150 for return to the process vessel.

Preferably contaminant removal mechanisms of the invention remove most if not all of the one or more solutes from the supercritical solution in a single pass of the solution through the mechanism, although the invention is not limited in this way. In some examples it may be acceptable for the purified solvent to have amounts of solute that do not pose a threat of precipitation or other harm to the process substrate or subsequent process that may be performed using the purified solvent. In some cases the purified solvent may be passed multiple times through the contaminant removal system in order to remove all but small traces of the solute or solutes. In such a scenario, more than one pass through the contaminant removal mechanism can provide, for example, an adsorbant material a second exposure to the remaining solute molecules in order to adsorb them. In an alternative example, a cartridge which holds spent adsorbant (e.g. full to capacity) may be replaced (via an appropriate mechanism such as a dual cartridge system) during recirculation of supercritical fluid through the system.

As mentioned, another aspect of the invention is a method of removing one or more solutes from a supercritical processing solution. Such methods may be characterized by the following sequence: flowing the supercritical processing solution through a process vessel and a recirculation loop, at least one of the process vessel and the recirculation loop including components of a contaminant removal mechanism; removing at least a portion of the one or more solutes with the contaminant removal mechanism to produce a purified solvent, the purified solvent having a reduced concentration of the one or more solutes; and recirculating the purified solvent through the process vessel and the recirculation loop. Preferably removing at least a portion of the one more contaminants with the contaminant removal mechanism includes exposing the supercritical processing solution to a set of conditions which separate the portion of said one or more solutes from the supercritical processing solution to produce the purified solvent and a contaminant phase. Also preferably, the purified solvent is a supercritical solvent.

Figure 9:
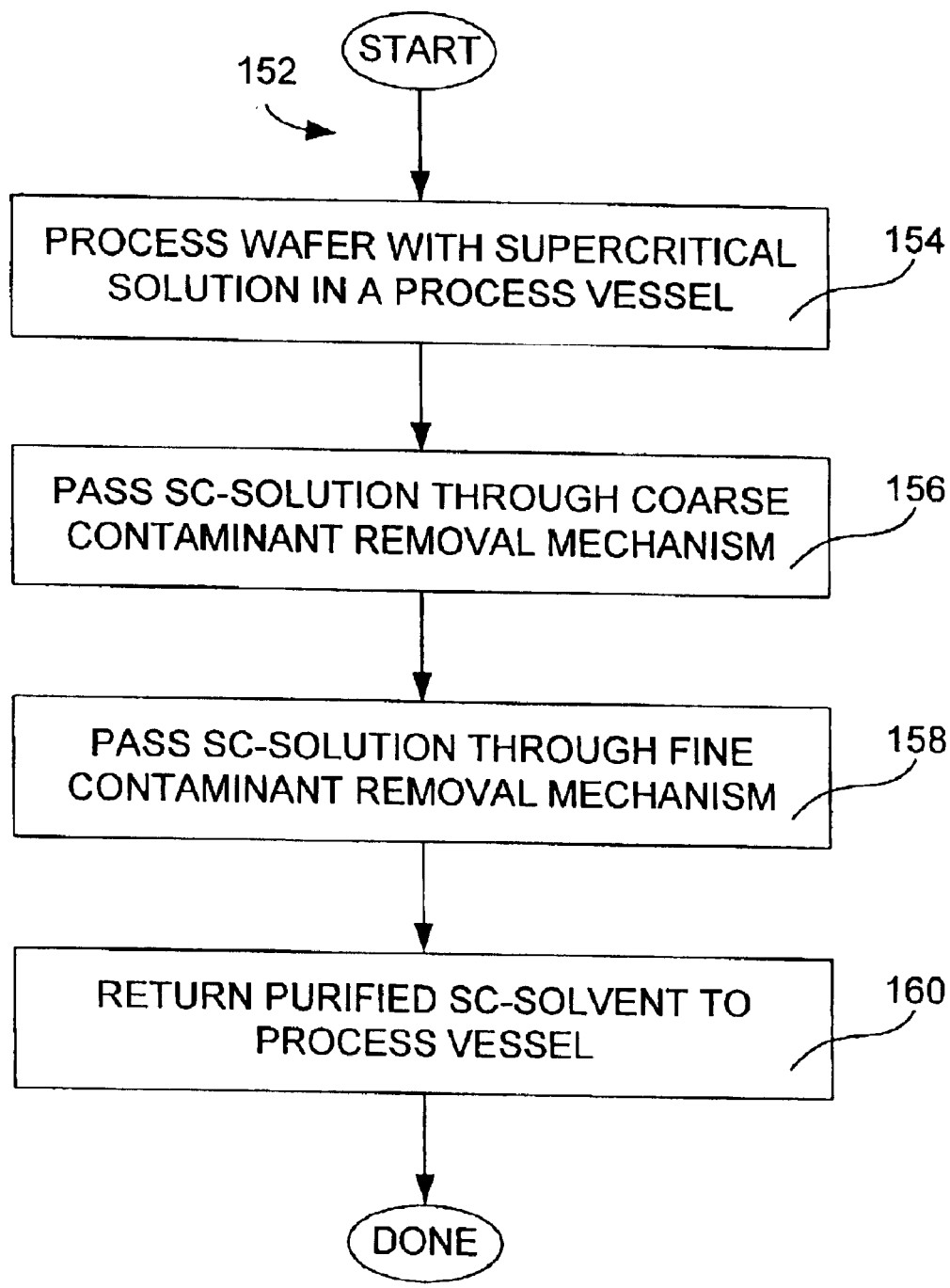
FIG. 9 is a flow chart depicting aspects of a process flow in accordance with the invention.

FIG. 9 is a flowchart showing aspects of a method, 152, for removing one or more solutes from a supercritical processing solution. In this example, method 152 is described in relation to a wafer processing apparatus. First, a wafer is processed with a supercritical solution in a process vessel. See 154. For example, a low-k dielectric film is deposited on a wafer using a POSS-material (Polyhedral Oligomeric SilSesquioxanes). Description of POSS-materials and methods for depositing POSS solid precursors (as solutes in supercritical fluids) on wafers to form dielectric layers are described in U.S. patent application Ser. No. 09/727,796 by Van Cleemput et al. entitled, "Dielectric Films with Low Dielectric Constants," which is herein incorporated for all purposes. Many POSS-materials are insoluble in traditional solvents at standard pressure and temperature, but are readily soluble in supercritical solvents. In this example, POSS-materials are deposited on a wafer in the process vessel, and after such a deposition, solute POSS-materials remain in the supercritical solution. These materials must be removed before the solution is taken to sub-critical conditions, otherwise they will precipitate out of solution and possibly ruin the wafer or contaminant the apparatus (e.g. the process vessel). Methods of the invention address such a need, without having to dilute the supercritical solution to remove the solute molecules.

After processing, the supercritical solution is passed through a coarse solute removal mechanism. See 156. As mentioned, this includes exposing the supercritical processing solution to a set of conditions which separate the portion of said one or more solutes from the supercritical processing solution to produce the purified solvent and a contaminant phase. Preferably, the set of conditions includes at least one of heating, cooling, irradiation, pressurization, depressurization, chemical addition, filtration, adsorption, oxidation, reduction, precipitation and combinations thereof. Preferably chemical addition comprises introduction of at least one of a reagent and a reactant to the supercritical processing solution. Preferably the reagent includes at least one of a complexing agent, a solvent an antisolvent, a catalyst, an adsorbent, and a surfactant. Preferably the reactant or the catalyst include at least one of an oxidant, a reductant, an acid, a base, a nucleophile, an electrophile, a free radical source, a radical initiator, and a metal oxide. Preferably the oxidant includes at least one of hydrogen peroxide, oxygen, ozone, water, an organic peroxide, a peroxide generator, and a hydroxyl radical generator. Also preferably the catalyst includes at least one m titanium dioxide, metal oxides, metal/metal oxide mixtures, substrate supported precious metals, etetrabutylammonium fluoride, di-tert-butylperoxide, azoisobisbutyronitrile, dicumyl peroxide, an organic acid, an activated carbon supported catalyst, an enzyme, Ziegler-Natta catalyst, a free radical generator or initiator, and a phase transfer catalyst. Preferably the acid is selected from the group consisting of mineral acids like sulfuric acid, hydrochloric acid, or organic acids, for example peracetic acid, acetic acid, benzoic acid, and the like. Preferably the base is selected from the group consisting of ammonium hydroxide, ammonia, alkyl ammonium hydroxides, amines, and metal hydroxides. Preferably irradiation includes exposing the supercritical solution to at least one of ultraviolet radiation, infrared radiation, high intensity visible light, and visible to near IR radiation.

In this example, a depressurization mechanism is used to lower the pressure of the supercritical solution within the coarse contaminant removal system. That is, a localized low-pressure (preferably within the supercritical regime of the solvent used) region is established in the flow of supercritical solution. This causes a majority of the POSS-material solute to precipitate from the supercritical solution.

The supercritical solution is then passed through a fine solute removal mechanism. See 158. For example, a cartridge with an adsorbent that has a high affinity for the POSS-material is used for this purpose. Preferably adsorbant materials of the invention include at least one of activated carbon zeolite, molecular sieve, ion exchange resin, and polymeric resin. Preferably the remaining solute molecules are removed from the supercritical solution to provide a purified solvent.

In another example the fine solute removal mechanism includes filtration. Preferably such a filtration includes passing said supercritical solution through a filtration mechanism selective to wards one or more solutes before returning the purified solvent to the process vessel. Preferably the filtration mechanism includes at least one of a semipermeable membrane, a zeolite, a molecular sieve, a nanotube composite, a ceramic filter, and a sintered metal filter After passing through the fine solute removal mechanism, the purified solvent is returned to the process vessel. See 160. Then the method is done.

Although various details have been omitted for clarity's sake, various design alternatives may be implemented. Therefore, the present examples are to be considered as illustrative and not restrictive, and the invention is not to be limited to the details given herein, but may be modified within the scope of the appended claims.

What is claimed is:

1. An apparatus for removing one or more solutes from a supercritical solution, the apparatus comprising:

a process vessel configured to treat semiconductor wafers with the supercritical solution;

a supercritical solution generator directly connected to the process vessel;

a recirculation loop coupled to the process vessel and allowing fluid communication with the process vessel; and a contaminant removal mechanism for removing said one or more solutes from the supercritical solution to provide a purified solvent, wherein at least one of the process vessel and the recirculation loop comprise components of the containment removal mechanism.

2. The apparatus of claim 1, wherein the process vessel includes components of the contaminant removal mechanism.

3. The apparatus of claim 1, wherein the purified solvent is a supercritical solvent.

4. The apparatus of claim 1, wherein the contaminant removal system consists of at least one of an irradiation mechanism, a heating mechanism, a cooling mechanism, a pressurization mechanism, a depressurization mechanism, a chemical addition mechanism, a filtration mechanism, a phase transfer mechanism, and a fluid pumping mechanism.

5. The apparatus of claim 4, wherein the chemical addition mechanism is configured to introduce a liquid to the supercritical processing solution without loss of supercritical conditions within the process vessel or the recirculation loop.

6. The apparatus of claim 4, wherein the filtration mechanism consists of at least one of an adsorbent, a semipermeable membrane, a sieve, a zeolite, a molecular sieve, a nanotube composite, a ceramic filter, and a sintered metal filter.

7. The apparatus of claim 5, wherein the adsorbent consists of at least one of activated carbon, a zeolite, an ion exchange resin, and a polymeric resin.

8. The apparatus of claim 4, wherein the irradiation mechanism consist of at least one of an ultraviolet light source, a high intensity discharge source, and a visible to near IR source.

9. The apparatus of claim 4, wherein the heating mechanisms consists of at least one of internal electrical or heating fluid circulation coils, external electrical or heating fluid circulation coils, a tube in tube heat exchanger, a shell and tube heat exchanger, and a radiative heating mechanism.

10. The apparatus of claim 4, wherein the cooling mechanism consists of at least one of an internal or circulated cooling fluid coils, refridgeration coils, and an evaporative cooling mechanism.

11. The apparatus of claim 4, wherein the contaminant removal mechanism comprises a primary removal mechanism for removing between about 51 and 99% of the one or more solutes, and a secondary removal mechanism for further purifying the process fluid by removing substantially all of the one or more solutes that remain in the fluid after the first removal mechanism.

12. The apparatus of claim 5, wherein the chemical addition mechanism comprises a pump or compressor configured to deliver the liquid uni-directionally to the supercritical solution such that supercritical conditions are not lost during chemical addition to the supercritical solution.

13. The apparatus of claim 1, wherein the recirculation loop comprises valves for isolating the recirculation loop from fluid communication with the process vessel.

14. The apparatus of claim 1, wherein the recirculation loop is part of a primary circulation loop, said primary circulation loop configured for adding the one or more solutes to a supercritical solvent in order to form the supercritical solution and recirculating the supercritical solution through the process vessel, said recirculation loop comprising the contaminant removal mechanism.

15. The apparatus of claim 14, wherein the recirculation loop comprises valves for isolating the recirculation loop from fluid communication with the primary circulation loop.

16. A method of removing one or more solutes from a supercritical processing solution, the method comprising:

generating a supercritical processing solution in a supercritical solution generator that is directly connected to a process vessel;

flowing the supercritical processing solution through the process vessel and a recirculation loop, at least one of the process vessel and the recirculation loop comprising components of a contaminant removal mechanism;

removing at least a portion of said one or more solutes with the contaminant removal mechanism to produce a purified solvent, said purified solvent having a reduced concentration of the one or more solutes; and recirculating the purified solvent through the process vessel and the recirculation loop;

wherein removing at least a portion of said one more contaminants with the contaminant removal mechanism comprises exposing the supercritical processing solution to a set of conditions which separate the portion of said one or more solutes from the supercritical processing solution to produce the purified solvent and a contaminant phase.

17. The method of claim 16, wherein the purified solvent is a supercritical solvent.

18. The method of claim 16, wherein the set of conditions consists of at least one of heating, cooling, irradiation, pressurization, depressurization, chemical addition, filtration, adsorption, oxidation, reduction, precipitation, and combinations thereof.

19. The method of claim 18, wherein chemical addition consist of introducing at least one of a reagent, a reactant, and a catalyst to the supercritical processing solution.

20. The method of claim 19, wherein the reagent consists of at least one of a complexing agent, a solvent, an antisolvent, a catalyst, an adsorbent, and a surfactant.

21. The method of clam 19, wherein the reactant or the catalyst consist of at least one of an oxidant, a reductant, an acid, a base, a nucleophile, an electophile, a free radical source, a radical initiator, a metal, and a metal oxide.

22. The method of claim 21, wherein the oxidant consists of at least one of hydrogen peroxide, oxygen, ozone, water, an organic peroxide, a peroxide generator, and a hydroxyl radical generator.

23. The method of claim 21, wherein the catalyst consists of at least one of titanium dioxide, metal oxides, metal/metal oxide mixtures, substrate supported precious metals, tetrabutylammonium fluoride, di-tert-butylperoxide, azoisobisbutyromitrile, dicumyl peroxide, an organic acid, an activated carbon supported catalyst, an enzyme, Ziegler-Nalta catalyst, a free radical generator or initiator, and a phase transfer catalyst.

24. The method of claim 21, wherein the acid consists of at least one of a mineral acid and an organic acid.

25. The method of claim 21, wherein the base consists of at least one of ammonium hydroxide, ammonia, an alki ammonium hydroxide, an amine, and a metal hydroxide.

26. The method of claim 18, wherein adsorption comprises passing said supercritical processing solution through an adsorbent material selective towards the one or more solutes.

27. The method of claim 26, wherein the adsorbent material consists of at least one of activated carbon, a zeolite, an ion exchange resin, and a polymeric resin.

28. The method of claim 18, wherein filtration comprises passing said supercritical processing solution through filtration mechanism, said filtration mechanism selective towards the one or more solutes.

29. The method of claim 27, wherein the filtration mechanism comprises at least one element selected from a group consisting of a semi-permeable membrane, a zeolite, a molecular sieve, a nanotube composite, a ceramic filter, and a sintered metal filter.

30. The method of claim 17, wherein irradiation comprises exposing the supercritical processing solution to at least one radiation selected from a list consisting of ultraviolet radiation, infrared radiation, and high intensity visible light.

31. Tho method of claim 15, wherein conditions which separate the portion of said one or more solutes from the supercritical processing solution to produce the purified solvent and the contaminant phase comprise converting said one or more solutes to other solute species in situ.

32. An apparatus for removing one or more solutes from a supercritical solution, the apparatus comprising:
- a process vessel having a flow inlet and a flow outlet and configured to treat semiconductor wafers with the supercritical solution;
- a contaminant removal mechanism for removing one or more solutes from the supercritical solution to provide a purified solvent, the contaminant removal mechanism including:
  - a single inlet connecting the flow outlet of the process vessel and the contaminant removal system; and
  - a single outlet connecting the flow inlet of the process vessel and the contaminant removal system; and
- a recirculation loop coupled to the process vessel and allowing supercritical solution to flow in and out of the process vessel, wherein at least one of the process vessel and the recirculation loop comprise components of the contaminant removal mechanism.

* * * * *